United States Patent
Jeffries et al.

(10) Patent No.: US 6,795,306 B2
(45) Date of Patent: Sep. 21, 2004

(54) METHOD OF PREVENTING LCD DAMAGE IN AN INFORMATION HANDLING SYSTEM

(75) Inventors: John A. Jeffries, Georgetown, TX (US); Reynold L. Liao, Austin, TX (US); Kurt J. Lippert, Austin, TX (US); Jay M. Zill, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 118 days.

(21) Appl. No.: 10/210,417

(22) Filed: Jul. 31, 2002

(65) Prior Publication Data

US 2004/0022014 A1 Feb. 5, 2004

(51) Int. Cl.[7] .............................................. H05K 5/00
(52) U.S. Cl. ...................... 361/683; 361/681; 361/686; 248/632; 248/633
(58) Field of Search ............................... 361/680–683; 312/223.1, 223.2; 248/631, 614, 619, 618; 400/691, 693

(56) References Cited

U.S. PATENT DOCUMENTS

| | | | |
|---|---|---|---|
| 5,706,168 A | * | 1/1998 | Erler et al. .................. 361/685 |
| 5,931,297 A | | 8/1999 | Weill et al. .................. 206/320 |
| 5,932,046 A | * | 8/1999 | Yates .......................... 156/145 |
| 6,151,207 A | | 11/2000 | Kim ............................ 361/681 |
| 6,262,886 B1 | * | 7/2001 | DiFonzo et al. ............. 361/683 |
| 6,275,374 B1 | | 8/2001 | Shin et al. ................... 361/680 |
| 6,317,313 B1 | | 11/2001 | Mosgrove et al. .......... 361/680 |
| 6,460,221 B1 | * | 10/2002 | Eromaki ....................... 15/286 |
| 6,519,139 B2 | * | 2/2003 | Kambayashi ................ 361/683 |
| 6,522,763 B2 | * | 2/2003 | Burleson et al. ............. 381/189 |

FOREIGN PATENT DOCUMENTS

WO    WO 97/26592    7/1997    ............. G06F/1/16

OTHER PUBLICATIONS

Dow Coming Toray Silicone Company Sales Specifications.

* cited by examiner

*Primary Examiner*—Darren Schuberg
*Assistant Examiner*—Anthony Q. Edwards
(74) *Attorney, Agent, or Firm*—Baker Botts L.L.P.

(57) ABSTRACT

A method of preventing LCD damage in an information handling system is disclosed. The method includes mounting an LCD in a screen portion of an information handling system. The LCD has a top layer with a particular hardness. Another step in the method is rotatably mounting a base portion of the information handling system to the screen portion such that the portions can assume a proximate position and a separated position. A material is affixed to the base portion such that at least a portion of the material is between the base portion and the LCD in the proximate position. The material has a hardness no greater than the hardness of the top layer of the LCD.

15 Claims, 2 Drawing Sheets

METHOD OF PREVENTING LCD DAMAGE IN AN INFORMATION HANDLING SYSTEM

TECHNICAL FIELD

The present disclosure relates generally to the field of information handling systems and, more particularly, to a method of preventing LCD damage in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include a variety of components for communicating information to the user of the system. One such output device is a liquid crystal display (LCD). LCDs are flat and can be thinner than other display devices such as cathode ray tube monitors. One type of information handling system that includes an LCD is a notebook computer. In many conventional notebook computers, a base portion includes input devices such as a keyboard, power or reset buttons, and pointer devices. A screen portion is connected by hinges at one edge to the base portion such that the two portions can rotate from an open position to a closed position like a book. The screen portion includes an LCD, but can also include input devices. In one embodiment, the base portion has a keyboard and a palmrest area. The keyboard is positioned closer to the LCD than the palmrest area when the notebook is in the open position. In this configuration, a user can operate the keyboard with her palms on the palmrest while facing the screen. The palmrest area may also include a touch pad and associated buttons as a pointer device. In other embodiments a trackball in the palmrest area functions as a pointer device. In other embodiments, a pointer device is mounted between keys of the keyboard.

If an information handling system with an LCD is stored or moved in a position where the LCD is proximate to other components, those components might damage the LCD if they come into contact with it. For example, an information handling system can include a closed position for being transported in which the LCD is separated from, for example, the keyboard by only a few millimeters. Physical vibrations and impulses can cause the LCD to flex from a planar orientation such that it would come into contact with the keyboard. Such contact could damage the top layer of the LCD. In the case of conventional notebook computers, contact with the palmrest area or the keyboard could cause such damage.

SUMMARY

In accordance with the present disclosure, an information handling system is disclosed. The information handling system includes a screen portion that has an LCD. The LCD includes a top layer that has a particular hardness. The information handling system also includes a base portion that is movably coupled to the screen portion between open and closed positions. A material is affixed to the base portion. The materials has a hardness no greater than the hardness of the top layer of the LCD. The material is located on the base portion such that at least a portion of the material is between the base portion and the LCD when the information handling system is in the closed position.

In another implementation of the present disclosure, a method of preventing LCD damage in an information handling system is disclosed. The method includes mounting an LCD in a screen portion of an information handling system. The LCD has a top layer with a particular hardness. Another step in the method is rotatably mounting a base portion of the information handling system to the screen portion such that the portions can assume a proximate position and a separated position. A material is affixed to the base portion such that at least a portion of the material is between the base portion and the LCD in the proximate position. The material has a hardness no greater than the hardness of the top layer of the LCD.

In another implementation of the present disclosure, an information handling system is disclosed. The information handling system includes a screen portion that has an LCD. The LCD includes a top layer that has a particular hardness. The information handling system also includes a base portion that is movably coupled to the screen portion between open and closed positions. A material is affixed to the base portion. The materials has a hardness no greater than the hardness of the top layer of the LCD. The material is located on the base portion such that when the information handling system is in the closed position, no other part of the base portion is as near to the LCD as the material.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
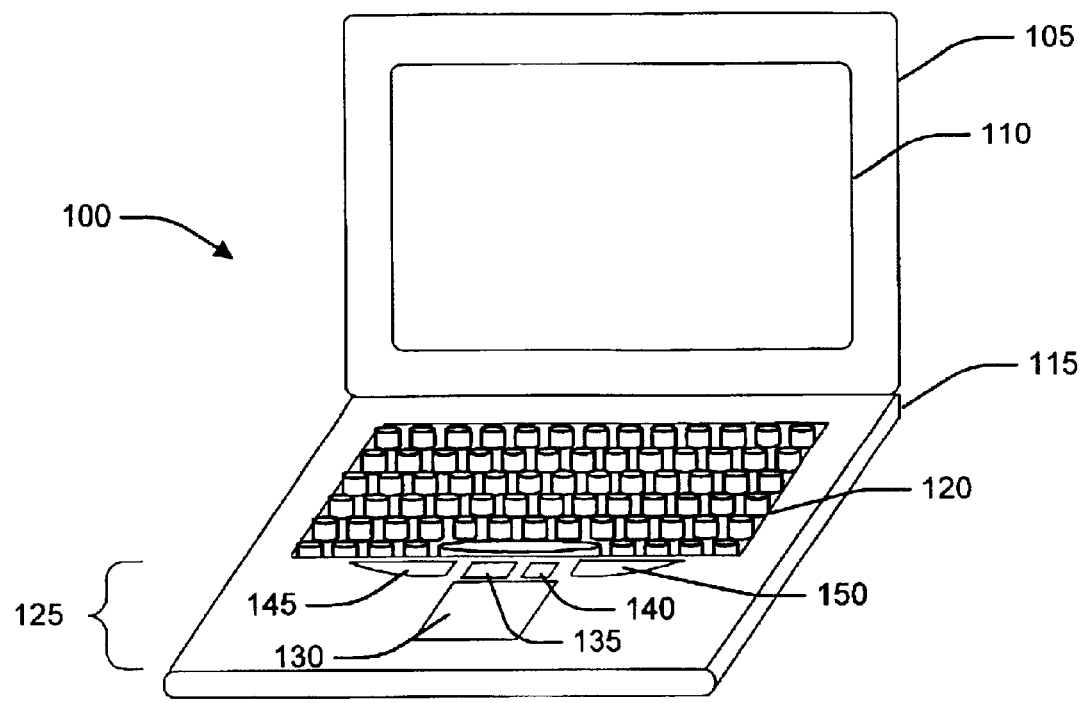
FIG. 1 is an isometric view of an information handling system in an open or separated position.

The present disclosure concerns a method and information handling system for preventing LCD damage. FIG. 1 depicts an information handling system in an open or separated position. The information handling system is designated generally as 100 and, in this example, is a notebook computer. A screen portion 105 of the notebook 100 includes a liquid crystal display (LCD) 110. Some LCDs are formed of many layers. The term top layer is used to identify the layer that is closest to a user viewing the LCD 110. If there is only one layer, that layer would be the top layer. The screen portion 105 of the notebook 100 is coupled to the base portion 115. In one implementation, two hinges are provided that each connect to an edge of the portions so that those edges are always proximate. Rotation of the screen portion relative to the base portion by means of the hinges moves the notebook between open and closed positions. In the closed position, see FIG. 2, the screen portion 105 and base portion 115 are proximate and parallel. In the open position, the screen portion 105 is separated from the base portion 115 (at least relative to the closed position) and held at an angle by the hinges. The present disclosure is not limited to any particular method of adjusting the relative positioning of the screen portion 105 and base portion 115.

The base portion 115 includes a keyboard 120 and a palmrest area 125. The keyboard 120 is shown with standard keys. In another implementation, the keyboard 120 may include a pointer device mounted between the keys. The palmrest area 125 includes a touch pad 130 that can be used as a pointer device. The palmrest area 125 also includes a left button 135 and a right button 140. In one implmentation, the left and right buttons 135, 140 function in the same manner as the left and right buttons on a standard computer mouse, while movement on the touch pad 130 functions in the same manner as movement of a standard computer mouse. In other implementations, the palmrest area 125 will include a trackball as a pointing device or will not include any pointing device.

The palmrest area 125 also includes a first piece of material 145 and a second piece of material 150. The pieces of material 145, 150 are affixed to the base portion 115 in either a permanent or removable manner. The material can be permanently affixed by methods including, but not limited to, use of an adhesive and plastic molding. The material can be removably affixed by methods including, but not limited to, shapes that snap into a mounting cavity in the base portion 115.

The pieces of material 145, 150 are located on the base portion 115 such that they are between the base portion 115 and the LCD 110 when the notebook 100 is in the closed position. In another implementation, only a portion of the material would be between the base portion 115 and the LCD 110. The material has a hardness that is no greater than the hardness of the top layer of the LCD 110. If the LCD 110 flexes (due for example, to impulse or vibration forces) while the notebook 100 is in the closed position and comes into contact with the material, the LCD 110 is less likely to be damaged. In one implementation the hardness of the top layer of the LCD 110 is H grade and a material is chosen that has a hardness of H grade or softer.

In one implementation, each piece of material 145, 150 is formed of silicone. One type of suitable silicone is available from Dow Croning Toray Silicon Co., Ltd. as product B 6650 Intermediate. Silicon with a hardness between 45–55 JIS A can also be used.

The pieces of material 145, 150 can be fairly thin, for example less than 2 millimeters. In one implementation, the pieces of material 145, 150 are approximately 1 millimeter thick. The pieces of material 145, 150 can be affixed to the base portion 115 either before or after the base portion 115 is coupeld to the screen portion 105 and before or after the LCD 110 is mounted in the screen portion 105.

Figure 2:
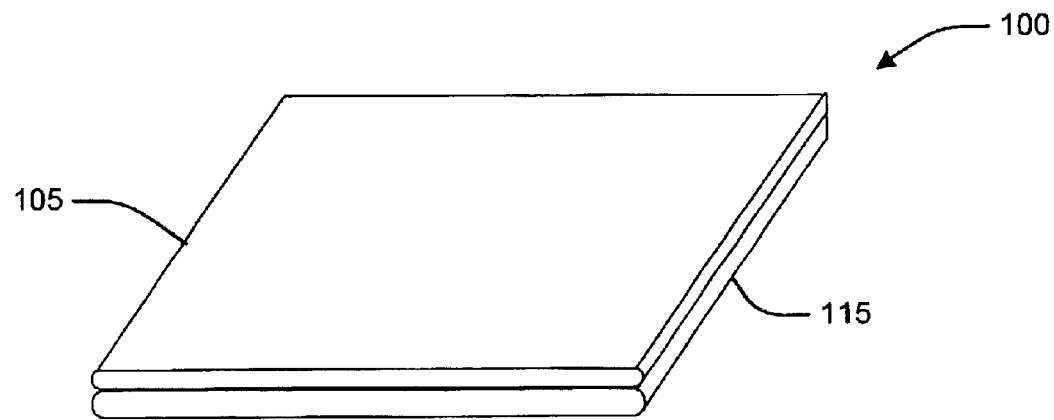
FIG. 2 is an isometric view of an information handling system in an closed or proximate position.

FIG. 2 depicts an information handling system 100 in an closed or proximate position. In this example the information handling system 100 is a notebook 100. In the closed position, the base portion 115 and the screen portion 105 are proximate and parallel. In this position the LCD 110 (hidden from view) is be separated from the palmrest area 125 (hidden from view) and the keyboard (hidden from view) by only a small gap, if any. In one implementation, the pieces of material 145, 150 (hidden from view) are closer to the LCD 110 (hidden from view) than any other part of the base portion 115.

Figure 3:
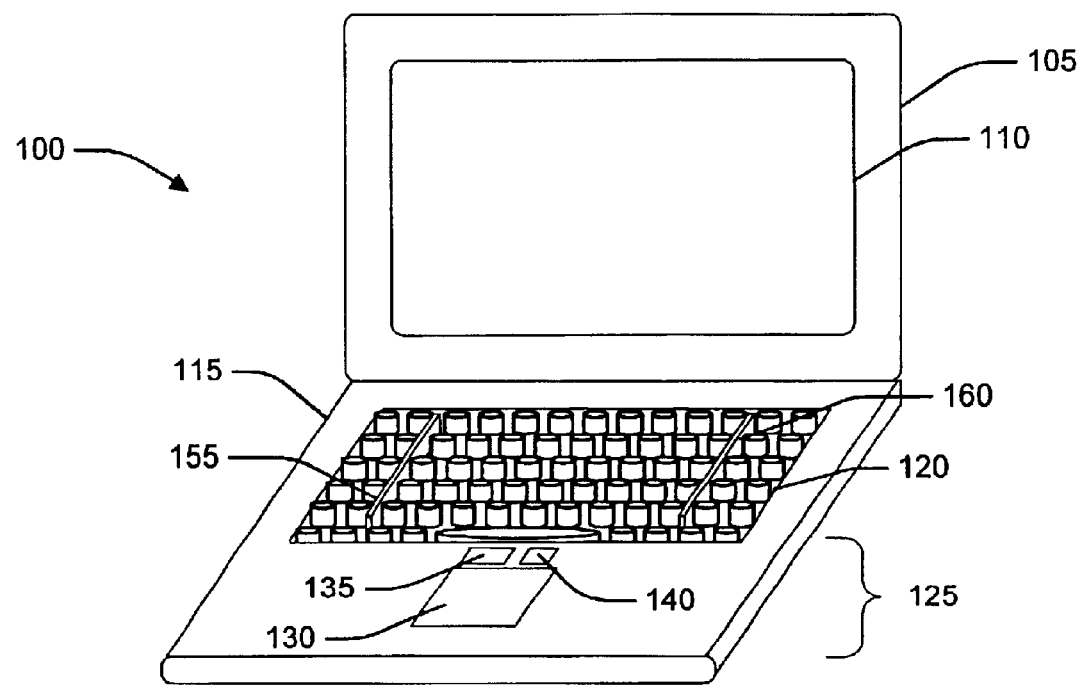
FIG. 3 is an isometric view of an information handling system in an open or separated position.

FIG. 3 depicts an information handling system in an open or separated position. This implementation differs from the one shown in FIG. 1 in that the pieces of material 155, 160 are located on the keyboard 120. The pieces of material 155, 160 are shown mounted between the keys. In another implementation, the material may be affixed to the keys themselves. When the notebook 100 is closed, at least a portion of the keyboard-mounted pieces of material 155, 160 will be between the base portion 115 and the LCD 110. In one embodiment, the material is mounted high enough relative to the base portion 115 to be the part of the base portion 115 that is closest to the LCD 110 when the notebook 100 is closed.

Figure 4:
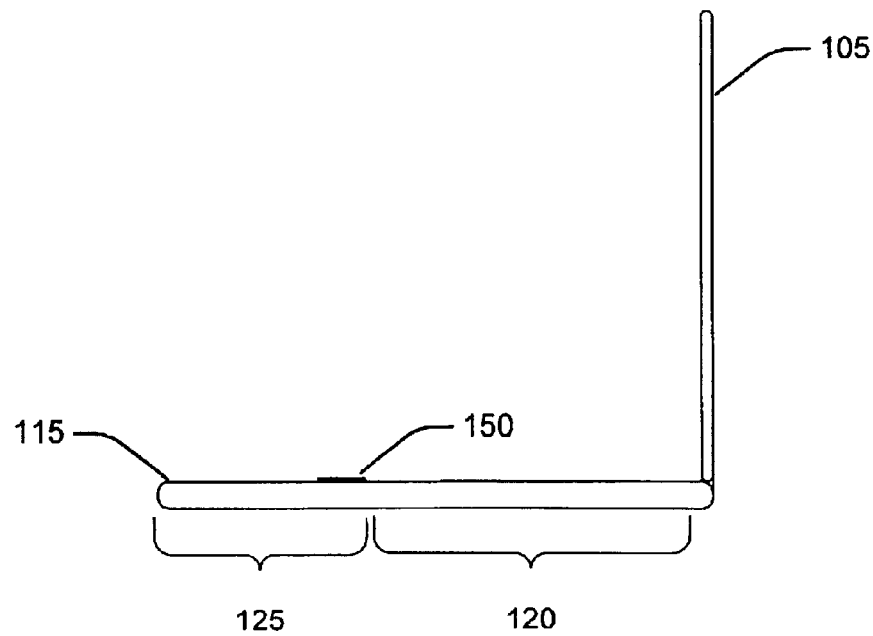
FIG. 4 is a side view of an information handling system in an open or separated position.

FIG. 4 is a side view of an open notebook 100. The rightmost piece of material 150 is visible upon the plane of the palmrest area 125 of the base portion 115. As discussed above, the material 150 can be approximately 1 millimeter thick. The screen portion 105 of the notebook 100 is separated from the base portion 115 so that a user can see the LCD (hidden from view) and employ the keyboard 120.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Although the present disclosure has been described in detail, it should be understood that various changes, substitutions, and alterations can be made hereto without departing from the spirit and the scope of the invention as defined by the appended claims.

What is claimed is:

1. An information handling system, comprising:
    a screen portion including a liquid crystal display (LCD), the LCD having a top layer that has a hardness;
    a base portion movably coupled to the screen portion between open and closed positions; and
    a material affixed to the base portion,
        the material having a hardness no greater than the hardness of the too layer of the LCD, the material located on the base portion such that at least a portion of the material is between the base portion and the LCD in the closed position wherein the base portion includes a keyboard to which the material is affixed.

2. The information handling system of claim 1, wherein the material is affixed to the base portion by an adhesive.

3. The information handling system of claim 1, wherein the material is removably affixed to the base portion.

4. An information handling system, comprising:

a screen portion including a liquid crystal display (LCD), the LCD having a top layer that has a hardness;

a base portion movably coupled to the screen portion between open and closed positions and including a keyboard; and a material affixed to the keyboard, the material having a hardness no greater than the hardness of the top layer of the LCD, the material located on the keyboard such that at least a portion of the material is between the keyboard and the LCD in the closed position wherein the material is less than 2 millimeters thick when measured in the dimension perpendicular to the base portion.

5. The information handling system of claim 4, wherein the material has a hardness of no greater than H-grade.

6. The information handling system of claim 4, wherein the material is affixed to the base portion by molding.

7. The information handling system of claim 4, wherein the material is affixed to a palmrest area of the base portion.

8. The A method of preventing LCD damage comprising the steps of:

(a) mounting an LCD in a screen portion of an information handling system, the LCD having a top layer that has a hardness;

(b) rotatably connecting a base portion of the information handling system to the screen portion such that the portions can assume a proximate position and a separate position; and (c) affixing a material to the base portion such that at least a portion of the material is between the base portion and the LCD in the proximate position, the material having a hardness no greater than the hardness of the top layer of the LCD wherein the base portion includes a keyboard and the step of affixing includes affixing the material to the keyboard.

9. The method of claim 8, wherein the step of affixing includes applying an adhesive.

10. The method of claim 8, wherein the step of affixing is removably affixing.

11. The method of claim 8, wherein step (c) occurs prior to steps (a) and (b).

12. The A method of preventing LCD damage, comprising the steps of:

(a) mounting an LCD in a screen portion of an information handing system, the LCD having a top layer that has a hardness;

(b) rotatably connecting a base portion of the information handling system to the screen portion such that the portions can assume a proximate position and a separate position; and (c) affixing a material to the base portion such that at least a portion of the material is between the base portion and the LCD in the proximate position, the material haying a hardness no greater than the hardness of the top layer of the LCD wherein the material is less than 2 millimeters thick when measured in the dimension perpendicular to the base portion.

13. The method of claim 12, wherein the material has a hardness no greater than H-grade.

14. The method of claim 12, wherein the material is affixed to the base portion by molding.

15. The method of claim 12, wherein the step of affixing includes affixing the material to a palmrest area of the base portion.

* * * * *